355-14 SH AU 215 EX
2/4/86 OR H 000,021

United States Statutory Invention Registration [19]

[11] Reg. Number: H21
[45] Published: Feb. 4, 1986

Schieck

[54] DOCUMENT HANDLING DEVICE

[75] Inventor: Richard A. Schieck, Rochester, N.Y.
[73] Assignee: Xerox Corporation, Stamford, Conn.

[21] Appl. No.: 633,736
[22] Filed: Jul. 23, 1984
[51] Int. Cl.[4] ..... G03B 27/162; G03G 15/00
[52] U.S. Cl. ..... 355/14 SH; 355/75
[58] Field of Search ..... 355/75, 76, 14 SH, 64, 355/72, 50; 271/84, 267, 269, 271

[56] References Cited

U.S. PATENT DOCUMENTS

| | | | |
|---|---|---|---|
| 3,288,459 | 11/1966 | Hitchcock et al. | 271/10 |
| 3,402,628 | 9/1968 | Redding et al. | 83/434 |
| 3,907,277 | 9/1975 | Robertson | 271/84 |
| 3,915,447 | 10/1975 | Perno | 271/7 |
| 3,941,473 | 3/1976 | Goffe | 355/75 |
| 3,944,366 | 3/1976 | Robertson | 355/76 |
| 3,988,065 | 10/1976 | Mileski et al. | 355/64 |
| 4,052,054 | 10/1977 | Cardwell et al. | 271/227 |
| 4,068,949 | 1/1978 | Booth et al. | 355/75 |
| 4,315,687 | 2/1982 | Breuers et al. | 355/75 |
| 4,367,947 | 1/1983 | Arter et al. | 355/75 |
| 4,368,977 | 1/1983 | Arter et al. | 355/75 |
| 4,428,666 | 1/1984 | Phelps et al. | 355/14 SH |

*Primary Examiner*—T. H. Tubbesing

[57] ABSTRACT

In a document feeder for a copier with a stationary copying platen, having a document transport tray system movable towards and away from the copying platen for transporting original documents to the platen for copying by movement of the document transport over the platen from a position adjacent the platen, wherein the improvement includes one or more unidirectional document holding wheels engageable and disengageable by the movement of the document transport for holding the original documents against the platen in position for copying, and a document ejecting wiper connected to and movable with the document transport for wiping across the platen to thereby remove documents on the platen and for pushing those removed documents off of only one side of the platen while further documents are being transported onto the platen by the document transport, and while the holding wheels are disengaged, with the movement of the document transport towards the platen, the wiper and document transport being adapted to prevent the wiper from engaging those further documents being transported onto the platen by the document transport.

11 Claims, 4 Drawing Figures

Figure 1:
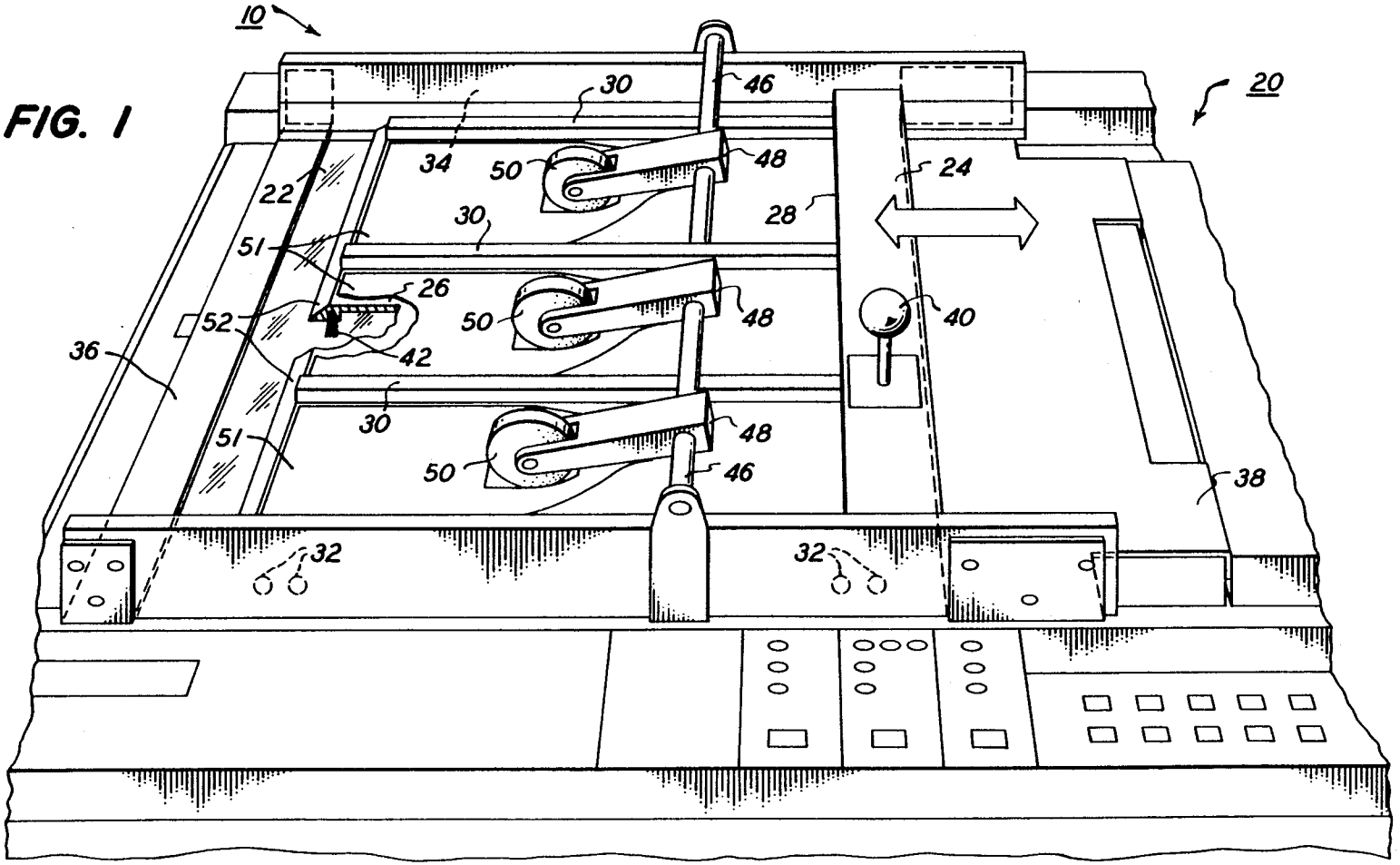

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DOCUMENT HANDLING DEVICE

This invention relates to a simple and low cost original document sheet feeder end ejector for a copier.

As copiers, particularly xerographic copiers, have increased in speed and applications, there has developed an increased need for apparatus and systems for sequential feeding of original documents to the copying (imaging) platen of the copier. As copiers themselves have become more compact and of lower cost, such document handlers desirably are also. There are also many specialized copying applications for which there is a special document handling need. For example, as disclosed herein, the capability of simultaneously feeding and ejecting a plurality of original documents to a platen for simultaneous copying, especially where those documents are envelopes, small sheets or cards. A desirable combined feature is the automatic registering of the fed documents in a desired copying position on the platen.

Even with smaller and slower speed copiers it has become increasingly desirable to provide at least semi-automatic document handling, in which the operator may initially load originals manually into an input of a document handler, but the document handler then desirably automatically provides the final feeding, deskewing and platen registration of the documents, and then automatically or semi-automatically ejects the documents after copying. These features are desirably all provided with as simple and low cost and compact a structure as possible.

A lightweight and removable document handler is particularly desirable to allow conventional manual copying on the same copier. That is, for the document handler or feeder to be repositionable or removable to expose the existing conventional transparent copying window (known as the platen) of the copier. This allows the operator to manually place on the same platen other documents, such as delicate or odd sized documents or books.

Examples of patent literature generally relating to various aspects of this technology are cited and discussed below. All references cited herein, and their references, are incorporated by reference herein for appropriate teachings of additional or alternative details, features, and/or technical background.

Cross-referenced and also incorporated by reference herein is a commonly filed, commonly assigned, copending patent application by the same inventor, U.S. Ser. No. 633,760, disclosing a copy sheet output slitter which may be used to automatically cut up copy sheets containing plural document images from plural documents fed to the platen or copier for copying onto a single copy sheet.

Of particular interest is U.S. Pat. No. 4,315,687 issued Feb. 16, 1982 to Breuers et al. (Oce-Nederland). It discloses one example of copying information from small plural original sheets simultaneously, and with a mask (form overlay) for providing additional information on the copy sheet. In Col. 1, line 54 it mentions subdividing the copy sheet.

The concept of positioning two documents on the platen for copying simultaneously onto a single copy sheet, and also a further disclosure of slitting the copying sheet into separate copies is disclosed in U.S. Pat. No. 3,402,628 to Redding. Note particularly the paragraph at the beginning of Col. 1.

U.S. Pat. No. 3,288,459 issued Nov. 29, 1966 to A. M. Hitchcock et al. and 4,052,054 issued Oct. 4, 1977 to W. R. Cardwell et al. disclosed an original document feeder for simultaneously feeding two original documents to be copied simultaneously. The former illustrates and particularly describes in Col. 3, middle, through Col. 4, a document tray 2 with a reciprocating plate 54 adapted to hold two documents. It places the documents on a moving belt transport 3 for transporting the documents through a downstream scanning station 4. The ejection of the documents is subsequently by that transport belt into a tray 92.

U.S. Pat. Nos. 4,367,947 and 4,368,977 were issued Jan. 11 and Jan. 18, 1983, respectively, to N. K. Arter et al. (IBM). Both disclose a moving platen copier in which unidirectional rollers 34, 35, provide for ejection of a document from the moving platen in one direction of movement of the platen. Note, e.g. Col. 4, last paragraph through Col. 5, last paragraph. Particularly also noted are the last lines of this paragraph wherein a "movable scrapper blade or finger" is generally suggested, but is not further described or illustrated. Nor is even any suggestion made that the latter could be unidirectional or how it could or would operate.

A unidirectional roller 72 is disclosed in a manual assist document feeder in U.S. Pat. No. 3,941,473 issued Mar. 2, 1976 to William Goffe. A unidirectional roller for a sheet stacker is disclosed in European Patent Application Publication No. 0 099 248 published Jan. 25, 1984 by R. W. Hughes et al.

U.S. Pat. Nos. 3,907,277 issued Sept. 23, 1975 and 3,944,366 issued Mar. 16, 1976, both to Donald A. Robertson, show a sliding platen cover apparatus manually reciprocal relative to a copier platen for exchanging documents to be copied on the platen. Although the two structures in these two patents differ, in both a document which has been copied is removed from the platen by frictional engagement with the cover member as it moves away from the platen. The documents are manually placed on the platen for copying.

U.S. Pat. No. 3,988,065 issued Oct. 26, 1976 to R. P. Mileski et al. is noted particularly for the small light reflective shields 60 associated with the document ejection drive wheels 30.

A typical commercial document feeder for a copier with a stationary (vs. moving) platen has a document transport means such as an endless belt to transport original documents to the platen for copying, and then to eject them, by movement of the document transport belt over the platen from a position adjacent the platen, such as disclosed, for example, in U.S. Pat. No. 4,428,666 issued Jan. 31, 1984 to R. L. Phelps et al, and the numerous references cited therein.

U.S. Pat. No. 3,915,447 issued Oct. 28, 1975 to B. J. Perno, discloses an endless belt document transport having a plurality of flexible tabs on the belt for deskewing and registering and gripping document sheets for conveyance over the platen.

Examples of various other patents generally teaching known document handlers and copiers and control systems therefor, including document and paper path switches and counters, are U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270 and 4,335,949. Conventional simple software instructions in a copier's conventional microprocessor logic circuitry and software of document handler and copier control functions and logic, as taught by the above and other patents and various commercial copiers, are well known and preferred. However, it will be appreciated that the functions and controls described herein may be alternatively conventionally incorporated into a copier utilizing any other suitable or known simple software or hard wired logic systems, switch controllers, etc. Suitable software for functions illustrated or described herein may vary depending on the particular microprocessor or microcomputer system utilized, of course, but will be already available to or readily programmable by those skilled in the art without experimentation from the descriptions and references provided herein.

The control of exemplary document and copy sheet handling systems may be accomplished by conventionally actuating them by signals from the controller directly or indirectly in response to simple programmed commands and from selected actuation or non-actuation of conventional copier switch inputs by the copier operator, such as switches selecting the number of copies to be made in that run, selecting simplex or duplex copying, selecting whether the documents are simplex or duplex, selecting a copy sheet supply tray, etc. The resultant controller signals may conventionally actuate various conventional electrical solenoid or cam controlled sheet deflector fingers, motors or clutches in the copier in the selected steps or sequences as programmed. Conventional sheet path sensors, switches and bail bars, connected to the controller, may be utilized for sensing and timing the positions of documents and copy sheets, as is well known in the art, and taught in the above and other patents and products. Copying systems utilize such conventional microprocessor control circuitry with such connecting switches and sensors for counting and comparing the numbers of document and copy sheets as they are fed and circulated, keeping track of their positions, counting the number of completed document set circulations and completed copies, etc. and thereby controlling the operation of the document and copy sheet feeders and inverters, etc.

The present invention desirably overcomes or reduces various of the problems or limitations discussed above and/or in the cited references.

A preferred specific feature disclosed in this specification is to provide, in a document feeder for a copier with a stationary copying platen having document transport means movable towards and away from the copying platen of the copier for transporting original documents to the platen for copying by movement of said document transport means over the platen from a position adjacent the platen, wherein the improvement comprises:

holding means, engageable and disengageable by movement of said document transport means, for holding the original documents against the platen in position for copying, and document ejecting wiping means, connected to and movable with said document transport means, for wiping across the platen to thereby remove documents on the platen and for pushing those removed documents off of only one side of the platen while further documents are being transported onto the platen by said document transport means, and while said holding means is disengaged, with said movement of said document transport means towards the platen, said wiping means and said document transport means being adapted to prevent said wiping means from engaging further documents being transported onto the platen by said document transport means.

Additional specific features disclosed herein are such as wherein said holding means for holding the original documents against the platen for copying comprises a frictional wheel freely rotatable only in the direction of said movement of said document transport means towards the platen and vertically movable and positioned and biased to engage and press downwardly against a document transported thereto by said document transport means, said frictional wheel resisting, by said engagement and by non-rotation, the movement of a document in the direction of movement of said document transport means away from the platen, so as to separate a document from said document transport means during said movement thereof away from the platen, and then to hold that document against the platen;

wherein said holding means for holding the original documents against the platen for copying further comprises a flexible lightweight light-reflective backing member extending over a document held against the platen by said frictional wheel and surrounding said frictional wheel and vertically movable therewith for providing a document imaging background;

wherein said document transport means includes camming means for engaging and lifting said frictional wheel vertically away from said platen and away from said wiping means to provide said disengaging of said holding means, and for rolling said frictional wheel onto said document transport means so as to freely roll over a document on said document transport means during said movement of said document transport means towards the platen;

wherein there are a plurality of independently operable and spaced apart said frictional wheels mounted over the platen for simultaneous registrations of a plurality of documents on the platen and wherein said document transport means is adapted to simultaneously feed a plurality of documents toward the platen for individual engagement and retention by said frictional wheels;

wherein said document transport means comprises a document supporting tray reciprocally movable over but spaced above the platen and adapted to transport documents on top of said supporting tray, and said wiping means is mounted beneath said supporting tray;

wherein said wiping means comprises a brush mounted adjacent the side of said document transport means adjacent the platen and extending from said document transport means sufficiently to make a document sweeping engagement with the platen as said transport means moves over the platen; and wherein said brush dimensionally extends across the platen transverse the direction of movement of said document transport means.

Figure 2:
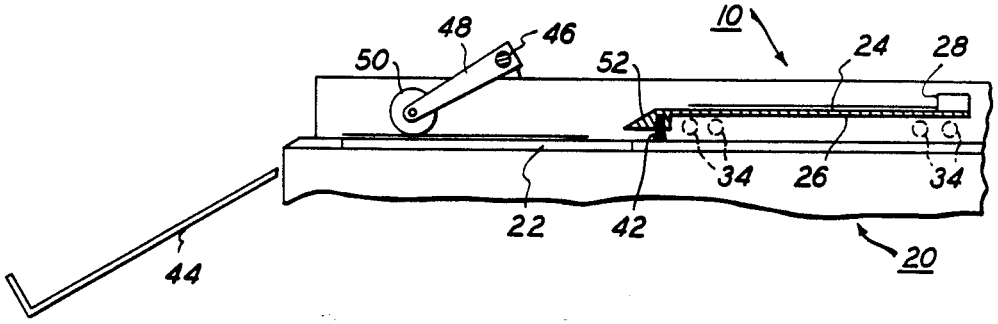
Figure 3:
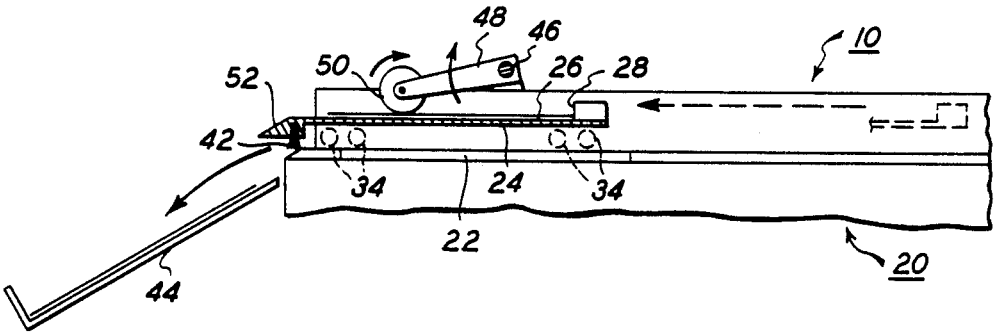
Figure 4:
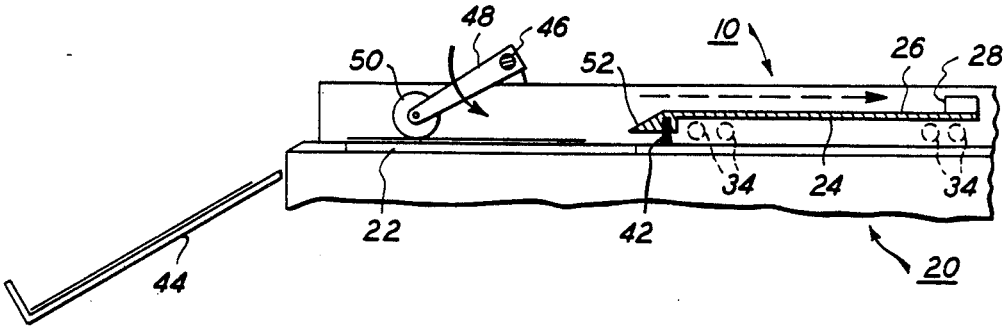

Various of the above-mentioned and further features and advantages will be apparent from the example described hereinbelow of one specific apparatus and its operation. The invention will be better understood by reference to the following description of this one specific embodiment thereof, which includes the following drawing figures (approximately to scale) wherein:

FIG. 1 is a perspective top view of one embodiment of an exemplary document feeding apparatus in accordance with the present invention mounted on an exemplary commercial copier; and FIGS. 2–4 are similar (schematic) side views of the exemplary document feeder of FIG. 1, showing this same feeder in three diffe.ent positions in its operation.

FIGS. 1–4 illustrate one example of the subject document feeder 10 for sequentially feeding document sheets to one example of a conventional copier 20 having a stationary conventional copying platen 22. The entire document feeder 10 is simply and easily mounted on top of any conventional copier, when the existing platen cover or document handler is pivoted out of the way to expose the platen, as is conventionally provided for alternative manual document copying. The operation of the document feeder 10 is shown particularly in FIGS. 2–4. Documents may be loaded into a document transport 24 while that transport 24 is at one side of the platen 22. The document transport 24 has a document holding tray 26 on its upper surface into which a document or documents may be easily loaded, and prealigned by a document rear edge stop or guide 28 and side guides 30. The entire document transport 24 may then be linearly moved over the platen by means of its mounting guides. Here these consist of two linear ball-bearing slides or tracks 32 and 34 extending across the front and rear ends of the platen. These slides 32 and 34 provide for smooth and reasonably accurate reciprocal movement of the document transport 24, from its initial position at one side of the platen as in FIG. 2, to a position over the platen as in FIG. 3, and a return back along the same path to the initial position as in FIG. 4. The slides 32, 34 are mounted at opposite ends to a left frame member 36 and a right frame member 38. The left frame member 36 mounts over the left side, here the registration edge, of the platen 22 and the right frame member 38 has vertical end tabs which can fit into a slot in the upper cover of the copier, to the right of the platen, to provide an appropriate and easily removable mounting of the document feeder 10 to the copier 20. The left frame member 36 may also have a hold-down bracket.

The reciprocal movement of the document transport 24 may be provided manually by an operator handle 40, or by an appropriate motor drive, e.g. the double helex reciprocal lamp drive of the "Xerox" "4000" copier and U.S. Pat. No. 3,775,008.

It may be seen that the tray 26 of the document transport 24, and all of its other moving components, with one exception, are spaced above the platen 22 at all times during the reciprocal movement of the document transport 24. That one exception is a brush 42, which is mounted to the document transport 24, adjacent the front or platen side thereof and extending downwardly from the document transport 24. The brush 24 extends laterally a sufficient width to extend substantially from the front to the back of the entire platen, extending between the slides 32 and 34. As the document transport 24 moves toward and over the platen, as in FIG. 3, the lower portion of the brush 24 engages and wipes across the platen 22 to remove and eject any documents on the platen, pushing all removed documents off of only the left side of the platen into a document ejection tray 44. Thus in each movement of the document transport 24 over the platen, any and all documents previously placed on the platen are automatically ejected, without requiring any operator intervention or action or any separate drives or mechanism.

In this same movement in which the document transport 24 automatically ejects all the documents in the platen by a document ejecting wiper 42, the subsequent documents to be copied are automatically fed onto the same platen 22. Yet there is no interference between these two functions with the present system. The document wiping or brushing system and the rest of the document transport 24 are so designed that the brush 42 is prevented from engaging any of the further documents being simultaneously transported onto the platen by the document transport 24. The brush 42 extends from beneath the tray 26 while the incoming further documents are transported on the top of the tray 26. These documents are not released and placed on the platen from the document transport 24 until the previous documents have already been swept therefrom by the brush 42. Likewise on the return movement of the document transport 24 the brush 42 slides back under the next document or documents being placed on the platen.

If desired, the brush 42 may be a known conductive, e.g. carbon fiber, brush to additionally provide platen static elimination.

Considering now the document platen placement and registration system provided here, this is also provided by a very simple structure. A mounting shaft 46 is provided extending over the platen from the front and rear slides 32, 34. That is, from the outer, stationary, channel portions of these slides. Pivotally mounted to the shaft 46 over the platen are weighted arms 48, having frictional wheels 50 pivotally mounted at their outer ends. There are three such arms 48, each with a wheel 50, spaced over the platen here because this particular document feeder 10 is specifically adapted to simultaneously feed three small documents, such as envelopes, statements or checks. Each wheel 50 has a one-way clutch only allowing for rotation of the wheels 50 in the direction of the movement of the document transport 24 toward the platen, as illustrated by the rotational arrows in the drawings. Each weighted arm 48 independently biases and presses its wheel 50 downwardly against a document transported thereunder by the document transport 24. Each wheel 50 is positioned to centrally engage, in the direction of document movement, one individual document from the document transport 24.

As particularly shown in FIGS. 2–4, the document transport 24 has a cam surface 52 at its front or platen-facing edge. The cam 52 is adapted to engage and lift up all of the wheels 50 (which independently pivot up via their pivotally mounted arms 48) as the document transport is moved onto the platen under the shaft 46. The wheels 50 then freely roll up the surface of the cam 52 and then roll over the surface of the tray 26 and over any documents therein as long as the document transport 24 is moving to the left, i.e. toward the platen. However, when the document transport 24 begins its reverse movement to the right, as in FIG. 4, the wrap spring, ratchet, or other conventional clutch associated with each wheel 50 prevents its reverse rotation. Thus the wheel 50 is non-rotatable in this direction of movement of the document transport 24 and fully frictionally resists the reverse movement of the document thereunder. As the wheels 50 are preferably urethane or other solid or foraminous high friction material, the document is held in position under the wheels 50 by this high frictional engagement. Thus the tray 26, which has a lower coefficient of friction, provided, e.g., by polished metal or plastic, slides out from under the now-retained document, and the wheels 50 retaining that document.

As the document transport 24 is pulled further to the right, completely out from under the wheels 50, the wheels 50 are now free to press the document down directly against the platen, and continue to hold the document in position on the platen until the entire document has been released by the tray 26 and is resting on the platen. The downward and downstream angle of the arms 48 provides an increased normal force vector component increasing the pressure of the wheels 50 against the document as the document transport 24 is moved to the right.

This is also preferably assisted by large white opaque flexible plastic document covering members 51 fastened to the arms 48 and surrounding and extending from the wheels 50. These provide, in effect, miniature flexible platen covers, here in the general shape of "mud flaps". They help hold the document flat and also cover areas of the platen not covered by the document to provide a proper imaging background.

As noted above, the next or "new" documents are placed on the platen just after, and with the same movement of the document transport 24, as the previous or "old" documents were being removed by the brush 42. At the completion of one reciprocal cycle as in FIG. 4, the document transport is off to the right of the platen and the tray 26 is now empty for the loading of subsequent documents while the previous documents are being copied by the copier. The copying may be initiated conventionally manually by a switch or foot pedal. Alternatively, copying may be initiated automatically by a magnet on the document transport 24 operating a reed switch on the copier when the document transport 24 is reciprocated over the platen, by passage of the magnet over the reed switch. The magnetic reed switch may be at the side of the platen and connected in parallel with the "START PRINT" button on the copier.

Skewing or mis-registration of the documents with this system is resisted by the plural parallel side guides 30 which, besides providing for compartmentalized loading of individual documents, also keep the edges of the document aligned as the document transport 24 is pulled away from the documents. Furthermore, by positioning each wheel 50 at a downstream area of the platen such that it engages a downstream area of a document centrally of the document, as shown, the frictional forces between the tray 26 and the document, as the tray 26 is pulled out from under the document, are providing a predominantly downstream pulling force tending to deskew the document. The side guides 30 should, of course, be parallel to the direction of movement of the document transport 24 to aid deskewing or resist skewing. Wider or double rollers 50 may also be provided for this purpose.

The document retention and registration provided by the wheels 50 does not interfere with the ejection of the documents thereunder by the brush 42 on the next reciprocal cycle of the document transport 24. That is, the pushing of the documents downstream by the brush 42 (to the left side of the platen) is not resisted by the wheels 50, since they freely rotate in that direction of movement of the document thereunder. Before the brush 42 reaches or contacts the wheels 50 themselves, they are cammed up over the top of the tray 26 by the cam 52. Thus, for the final ejection movement of the documents from the platen the wheels 50 and their attached flaps 51 are lifted totally away from the platen, and out of contact with any document thereon.

As the tray 26 is pushed towards the platen and under wheels 50, there is a (relatively small) drag on the documents by the wheels 50 in their "free-wheeling" direction of rotation, plus a slight drag of the flaps 51 on the documents. That is sufficient to automatically slide-register the rear (trail) edge of each document against the tray 26 rear guide 28. That also automatically initially deskews each document in the tray 26. The tray 26 has a fixed end-stop position of slides 32, 34 relative to the platen, and the rear guide 28 is fixed relative to the tray 26. Therefore each document is accurately automatically pre-registered to a relative position on the platen.

Summarizing the above operation, plural documents prepositioned within guides on a simple reciprocating tray adjacent the conventional fixed platen of the copier are linearly transported on that tray over the platen. There they are each engaged by a roller mounted in a fixed position over the platen which freely rolls over a document in one direction, but which is clutched so that upon the reverse movement of the tray the document is frictionally removed from the tray automatically by the locked wheel and both are dropped onto the platen in proper copying position. Meanwhile, any documents previously placed on the platen have been removed in this same operation and movement by a document ejecting brush wiping across the platen under but with the tray. With this system, document exchanges can take place as fast as the operator can load documents and reciprocate the document transport 24. The individual documents may be more or less thrown in between the guides, i.e. with only very rough or crude initial orientation, yet the documents are placed in position in the platen with considerable accuracy. They are removed from the platen automatically without requiring any extra step or any additional time.

The present system is particularly suitable for documents which are difficult to feed with automatic document feeders, such as envelopes of various materials, thicknesses and contents. As shown here, a semi-automatic document feeder is provided in which documents are individually loaded and fed. However, it will be appreciated that by appropriate modification of the tray 26, using known document feeding techniques, that a stack or stacks of checks, slips, invoices or the like may be placed in the tray 26 instead of individual documents. That is, with a front edge separating lip, or corners or front snubbers, or the like, for the tray 26, the present system may be utilized for sequential feeding of the topmost sheet from one or more stacks of sheets in the tray 26.

It will also be appreciated that both the wheels 50 with their arms 48 may be readily repositioned, by sliding them along the shaft 46, to accommodate different numbers or sizes of documents. Preferably this would be accompanied by a corresponding repositioning, or removing, of side guides 30, so that each wheel 50 is positioned intermediately of each pair of opposing spaced side guides 30, as illustrated in FIG. 1. The number and position of the side guides 30 on the tray 26 provides appropriate subdivisions into plural narrow trays for the plural document feeding to be provided. The number of arms 48 and wheels 50 may be correspondingly increased or decreased.

A particular application of the present system is for generating three U.S. Postal Service forms 3547 per copier cycle. This is accomplished by simultaneously feeding three envelopes at a time, each with its forwarding address sticker thereon, to the copier platen with this system. The platen is provided with a transparent forms overlay containing three sets of the appropriate additional printed information necessary to automatically generate three complete form 3547 postcard images containing both the original address and forwarding address information. A reduction (optically reduced image size) copy is made of the composite image of the form and the envelopes, which are over the transparent areas of the form. Each single copy sheet, preferably conventional letter size cardstock, containing these three composite images is then outputted from the copier through a slitter which cuts that single sheet into three postcards, as further described in the above-referenced commonly filed application by the same inventor.

While the embodiment disclosed herein is preferred, it will be appreciated that it is merely one example, and that various alternatives, modifications, variations or improvements thereon may be made by those skilled in the art from this teaching, which is intended to be encompassed by the following claims.

What is claimed is:

1. In a document feeder for a copier with a stationary copying platen having document transport means movable towards and away from the copying platen of the copier for transporting original documents to the platen for copying by movement of said document transport means over the platen from a position adjacent the platen, wherein the improvement comprises:

holding means, engageable and disengageable by movement of said document transport means, for holding the original documents against the platen in position for copying, and document ejecting wiping means, connected to and movable with said document transport means, for wiping across the platen to thereby remove documents on the platen and for pushing those removed documents off of only one side of the platen while further documents are being transported onto the platen by said document transport means, and while said holding means is disengaged, with said movement of said document transport means towards the platen, wiping means and said document transport means being adapted to prevent said wiping means from engaging said further documents being transported onto the platen by said document transport means.

2. The document feeder of claim 1 wherein said holding means for holding the original documents against the platen for copying comprises a frictional wheel freely rotatable only in the direction of said movement of said document transport means towards the platen and vertically movable and positioned and biased to engage and press downwardly against a document transported thereto by said document transport means, said frictional wheel resisting, by said engagement and by non-rotation, the movement of a document in the direction of movement of said document transport means away from the platen, so as to separate a document from said document transport means during said movement thereof away from the platen, and then to hold that document against the platen.

3. The document feeder of claim 2 wherein said holding means for holding the original documents against the platen for copying further comprises a flexible light-weight light-reflective backing member extending over a document held against the platen by said frictional wheel and surrounding said frictional wheel and vertically movable therewith for providing a document imaging background.

4. The document feeder of claim 2 wherein said document transport means includes camming means for engaging and lifting said frictional wheel vertically away from said platen and away from said wiping means to provide said disengaging of said holding means, and for rolling said frictional wheel onto said document transport means so as to freely roll over a document on said document transport means during said movement of said document transport means towards the platen.

5. The document feeder of claim 2 wherein there are a plurality of independently operable and spaced apart said frictional wheels mounted over the platen for simultaneous registrations of a plurality of documents on the platen and wherein said document transport means is adapted to simultaneously feed a plurality of documents toward the platen for individual engagement and retention by said frictional wheels.

6. The document feeder of claim 5 wherein said document transport means includes camming means for engaging and lifting said frictional wheel vertically away from said platen and away from said wiping means to provide said disengaging of said holding means, and for rolling said frictional wheel onto said document transport means so as to freely roll over a document on said document transport means during said movement of said document transport means towards the platen.

7. The document feeder of claim 1 wherein said document transport means comprises a document supporting tray reciprocally movable over but spaced above the platen and adapted to transport documents on top of said supporting tray, and said wiping means is mounted beneath said supporting tray.

8. The document feeder of claim 1 wherein said wiping means comprises a brush mounted adjacent the side of said document transport means adjacent the platen and extending from said document transport means sufficiently to make a document sweeping engagement with the platen as said transport means moves over the platen.

9. The document feeder of claim 8 wherein said brush dimensionally extends across the platen transverse the direction of movement of said document transport means.

10. The document feeder of claim 8 wherein said document transport means comprises a document supporting tray reciprocally movable over but spaced above the platen and adapted to transport documents on top of said supporting tray, and said wiping means is mounted beneath said supporting tray.

11. The document feeder of claim 10 wherein said holding means for holding the original documents against the platen for copying comprises a frictional wheel freely rotatable only in the direction of said movement of said document transport means towards the platen and vertically movable and positioned and biased to engage and press downwardly against a document transported thereto by said document transport means, said frictional wheel resisting, by said engagement and by non-rotation, the movement of a document in the direction of movement of said document transport means away from the platen, so as to separate a document from said document transport means during said movement thereof away from the platen, and then to hold that document against the platen, and wherein said document transport means includes camming means for engaging and lifting said frictional wheel vertically away from said platen and away from said wiping means to provide said disengaging of said holding means, and for rolling said frictional wheel onto said document transport means so as to freely roll over a document on said document transport means during said movement of said document transport means towards the platen.

* * * * *